Feb. 13, 1962 — H. D. LOCKHART — 3,020,670
FISHING FLOAT
Filed Dec. 3, 1959

INVENTOR.
Hervey D. Lockhart
BY Ralph Hammer
Attorney

United States Patent Office 3,020,670
Patented Feb. 13, 1962

3,020,670
FISHING FLOAT
Hervey D. Lockhart, Ashville, N.Y.
Filed Dec. 3, 1959, Ser. No. 857,165
2 Claims. (Cl. 43—44.91)

This invention is a fishing float or bob which is fastened to the line in a manner eliminating localized strain which could result in breakage. The float also has little tendency to tangle in weeds.

Figure 1:
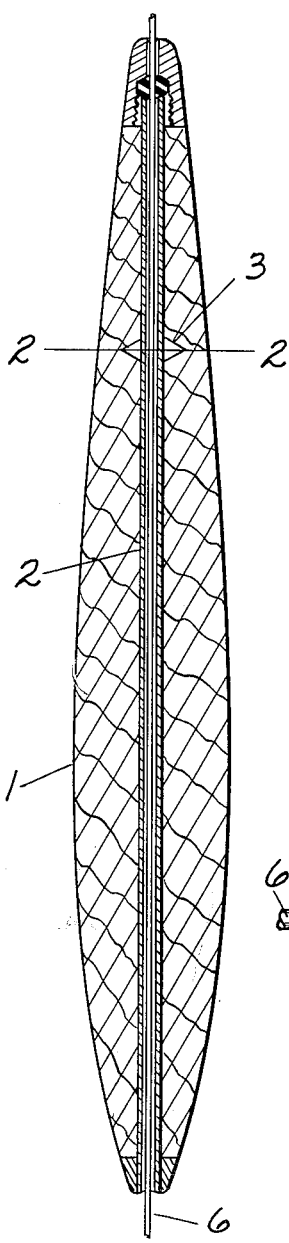
Figure 2:
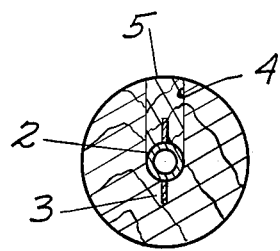
Figure 4:
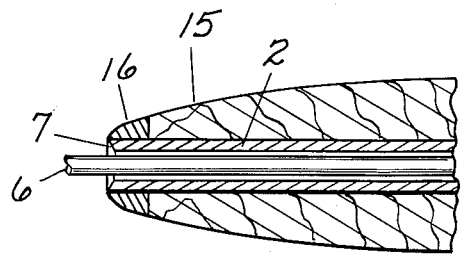
Figure 3:
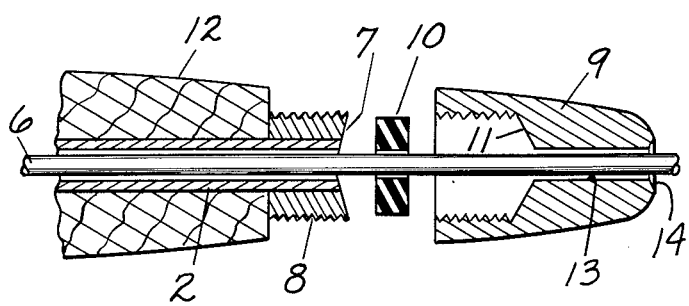

In the drawing, FIG. 1 is a longitudinal section through the float, FIG. 2 is a transverse section of line 2—2 of FIG. 1, FIG. 3 is an enlarged view of the end of the float connected to the line, and FIG. 4 is an enlarged view of the opposite end of the float.

The float has an elongated body 1 tapered from the center toward both ends to provide a streamlined surface which permits the float to move through weeds without tangling. The body of the float is made of suitable light material, for example, balsa wood. Through the center of the body is a metal tube 2 of non-corrosive material such as brass which is non rotatably anchored in the body by flat tangs 3 parallel to the axis of the body and projecting radially outside the tube. In manufacture, a longitudinal slot 4 is cut in the body and the tube 2 is laid in the slot with the lowermost tang pushed into the body at the bottom of the slot. The slot is then filled with an insert of the same material as the body into which the uppermost tang is embedded. This construction positively prevents rotation of the tube.

The inside diameter of the tube 2 provides a free running clearance for a fish line 6 which permits the float to be adjusted to any desired position along the length of the line. There is a slight outward flare as indicated at 7 on both ends of the tube, eliminating sharp corners which might cut the line.

The float is fastened to the line by the construction shown in greater detail in FIG. 3. An externally threaded sleeve 8 is fixed, for example by soldering, to the outer end of the tube 2. A sleeve nut 9 is threaded on the sleeve 8 compressing an annular washer 10 of rubber or like elastomeric material between the outer end of the tube and sleeve 8 and a shoulder 11 in the sleeve nut 9. The compression of the washer 10 squeezes it into uniform gripping of the line, avoiding any metallic contact with the line or pinching which could produce a weak point at which line breakage could occur. The tightness of the grip on the line is determined by the compression of the washer and can be adjusted from a slip fit to a positive lock as desired. The outer surface of the sleeve nut blends into the adjacent tapered end 12 of the float continuing the non fouling streamlined shape. The center bore 13 of the sleeve nut has an outwardly flared end 14. At the opposite end 15 of the float, a similarly streamlined bushing 16 is suitably fixed to the tube.

The sleeve 8 and sleeve nut 9 constitute a compression fitting which when tightened compresses the washer uniformly about its center and squeezes it radially into uniform gripping engagement with the line. This avoids localized stress on the line at which breakage could start.

What is claimed as new is:

1. In a fishing float, a bouyant body having a longitudinal slot therein from end to end and a filler in the slot, a tube lying in the slot having a relatively flat tang parallel to the tube embedded in the body and projecting radially outside the tube and oriented to prevent rotation of the tube relative to the body, said tube slidably receiving a fish line, a washer of elastomeric material surrounding the line at one end of the tube, said washer having an aperture slightly larger than a fish line, a compression fitting with an aperture of size larger than the line, said fitting comprising two screw threaded parts, one part being mounted on the tube and having an axially presented shoulder for one side of the washer, the other part having an axially presented shoulder for the other side of the washer, and said shoulders when tightened against opposite sides of the washer compressing the washer uniformly about its center to squeeze it radially inward into gripping engagement with the line when said parts are screwed toward each other.

2. In a fishing float, a bouyant body, a tube embedded in and extending through the body, said tube having a relatively flat tang parallel to the tube embedded in the body and projecting radially outside the tube and oriented to prevent rotation of the tube relative to the body, said tube slidably receiving a fish line, a washer of elastomeric material surrounding the line at one end of the tube, said washer having an aperture slightly larger than a fish line, a compression fitting with an aperture of size larger than the line, said fitting comprising two screw threaded parts, one part being mounted on the tube and having an axially presented shoulder for one side of the washer, the other part having an axially presented shoulder for the other side of the washer, and said shoulders when tightened against opposite sides of the washer compressing the washer uniformly about its center to squeeze it radially inward into gripping engagement with the line when said parts are screwed toward each other.

References Cited in the file of this patent
UNITED STATES PATENTS

| | | |
|---|---|---|
| 862,853 | Simmons | Aug. 6, 1907 |
| 2,259,605 | Baxendale | Oct. 21, 1941 |
| 2,474,498 | Schawbe | June 28, 1949 |
| 2,478,486 | Holleron et al. | Aug. 9, 1949 |
| 2,869,883 | Dunbar | Jan. 20, 1959 |